(12) United States Patent
Lai et al.

(10) Patent No.: US 12,170,375 B2
(45) Date of Patent: Dec. 17, 2024

(54) COPPER FOIL HAVING EXCELLENT HEAT RESISTANCE PROPERTY

(71) Applicant: CHANG CHUN PETROCHEMICAL CO., LTD., Taipei (TW)

(72) Inventors: Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 300 days.

(21) Appl. No.: 16/668,735

(22) Filed: Oct. 30, 2019

(65) Prior Publication Data

US 2021/0135233 A1 May 6, 2021

(51) Int. Cl.
*H01M 4/66* (2006.01)
*C25D 1/04* (2006.01)
(Continued)

(52) U.S. Cl.
CPC .............. *H01M 4/661* (2013.01); *C25D 1/04* (2013.01); *C25D 3/04* (2013.01); *C25D 3/38* (2013.01);
(Continued)

(58) Field of Classification Search
CPC .......... H01M 4/661; H01M 4/13; H01M 2/26; H01M 10/0525; C25D 1/04; C25D 3/04; C25D 3/38
See application file for complete search history.

(56) References Cited

U.S. PATENT DOCUMENTS

| 3,259,491 A | * | 7/1966 | Pryor | ..................... C23C 26/00 428/471 |
| 2010/0136434 A1 | * | 6/2010 | Hanafusa | .............. H01M 4/667 429/245 |

(Continued)

FOREIGN PATENT DOCUMENTS

| CN | 1449589 A | 10/2003 |
| CN | 105609710 A | 5/2016 |

(Continued)

OTHER PUBLICATIONS

European Search Report for 20204871.6, mailed Mar. 4, 2021.
(Continued)

*Primary Examiner* — Brian R Ohara
*Assistant Examiner* — Brent C Thomas
(74) *Attorney, Agent, or Firm* — NIXON PEABODY LLP

(57) ABSTRACT

Electrodeposited copper foils are described having improved thermal properties. The copper foils include a drum side and deposited side where both sides have a roughness Rz lower than 2 μm and wherein, when the electrodeposited copper foil is subjected to a thermal gravimetric analysis (TGA), the electrodeposited copper foil exhibits a primary weight increase of 105 wt. % when a primary temperature ($T_{105 \, wt \, \%}$) is reached during the TGA, wherein the $T_{105 \, wt \, \%}$ is in a range of 350° C. to 501° C. The TGA characterization comprises heating at a rate of 5° C./min and an air flow at a rate of 95 mL/min. Ultrasonic welding of the copper foils to nickel foils provides an excellent weld with low detachment providing a good mechanical and electrical contact for applications such as in lithium-ion secondary batteries.

9 Claims, 1 Drawing Sheet

(51) Int. Cl.
  *C25D 3/04* (2006.01)
  *C25D 3/38* (2006.01)
  *H01M 4/13* (2010.01)
  *H01M 10/0525* (2010.01)
  *H01M 50/531* (2021.01)

(52) U.S. Cl.
  CPC ............ *H01M 4/13* (2013.01); *H01M 4/667* (2013.01); *H01M 10/0525* (2013.01); *H01M 50/531* (2021.01)

(56) References Cited

U.S. PATENT DOCUMENTS

| | | | | |
|---|---|---|---|---|
| 2010/0159337 A1* | 6/2010 | Matsumoto | ............ | H01M 4/13 429/337 |
| 2014/0127569 A1* | 5/2014 | Maeda | ................. | H01M 4/667 429/211 |
| 2015/0340639 A1* | 11/2015 | Matsuura | ................. | C25D 1/04 257/741 |
| 2016/0060125 A1 | 3/2016 | Chung et al. | | |
| 2018/0119301 A1* | 5/2018 | Kim | ........................ | H01M 4/66 |
| 2018/0123135 A1* | 5/2018 | Kim | ........................ | C25D 21/12 |
| 2018/0226655 A1 | 8/2018 | Arai et al. | | |

FOREIGN PATENT DOCUMENTS

| | | |
|---|---|---|
| CN | 106972175 A | 7/2017 |
| CN | 107078304 A | 8/2017 |
| CN | 107946596 A | 4/2018 |
| CN | 108026653 A | 5/2018 |
| CN | 109868490 A | 6/2019 |
| EP | 2692904 A1 | 2/2014 |
| EP | 3309881 A1 | 4/2018 |
| EP | 3358047 A1 | 8/2018 |
| JP | 2012211351 A | 11/2012 |
| JP | 5916904 B1 | 5/2016 |
| JP | 2016125120 A | 7/2016 |
| KR | 20170000761 A | 1/2017 |
| KR | 10-2018-0040754 A | 4/2018 |
| KR | 10-2012-0103355 A | 9/2021 |
| TW | I381071 B | 1/2013 |
| TW | I660541 B | 5/2019 |
| WO | 2013/129588 A1 | 9/2013 |
| WO | 2019/151719 A1 | 8/2019 |

OTHER PUBLICATIONS

CN Notice of Allowance in Application No. 202010844041.4 dated Jan. 2, 2024, 6 pp.
TW 1st Non-Final Office in Application No. 109110012 dated Dec. 2, 2010, 12 pp.
JP 1st Non-Final Office Action in Application No. 2020-178316 dated May 16, 2023, 4 pp.
KR 1st Non-Final Office Action in Application No. 10-2020-0142475 dated Mar. 2, 2023, 6 pp.
KR Notice of Final Rejection in Application No. 10-2020-0142475, May 3, 2023, 6 pp.
TW 2nd Non-Final Office Action in Application No. 109110012, Apr. 18, 2011, 6 pp.
TW Notice of Allowance in Application No. 109110012, Sep. 1, 2011, 4 pp.
JP 2nd Non-Final Office Action Application No. 2020-178316, Aug. 22, 2023, 4 pp.
JP Notice of Allowance Application No. 2020-178316, Dec. 5, 2023, 5 pp.
KR Notice of Allowance Application No. 2023-0101081, Sep. 12, 2023, 4 pp.

\* cited by examiner

COPPER FOIL HAVING EXCELLENT HEAT RESISTANCE PROPERTY

FIELD OF THE INVENTION

The present disclosure relates to electrodeposited copper foils having high heat resistance properties. This disclosure also relates to electrodeposited copper foils having excelling welding properties, such as having good properties for welding to nickel foil tabs.

BACKGROUND

Lithium-ion secondary batteries have a combination of high energy and high power density, making it the technology of choice for portable electronic devices, power tools, electric vehicles ("EVs"), energy storage systems ("ESS"), cell phones, tablets, space applications, military applications, and railways. Electric vehicles (EVs), include hybrid electric vehicles ("HEVs"), plug-in hybrid electric vehicles ("PHEVs"), and pure battery electric vehicles ("BEVs"). If electric vehicles (EVs) replace the majority of fossil fuel (e.g., gasoline, diesel fuel, etc.) powered transportation, lithium-ion secondary batteries will significantly reduce greenhouse gas emissions. The high energy efficiency of lithium-ion secondary batteries may also allow their use in various electric grid applications, including improving the quality of energy harvested from wind, solar, geo-thermal and other renewable sources, thus contributing to their more widespread use in building an energy-sustainable economy.

Therefore, lithium-ion secondary batteries are of intense interest for commercial ventures as well as in basic research in government and academic laboratories. Although research and development in this field has abounded in recent years and lithium-ion secondary batteries are currently in use, there remains a need for improvements with respect to higher capacity, higher current generation, and batteries that can undergo more charge/discharge cycles thereby extending their useful life. Additionally, improvements in the weight of the batteries are needed to improve applications in several environments, such as vehicle, portable electronics and space applications.

Secondary lithium-ion batteries typically include a current collector of a metal foil on which is deposited an active material, and a metal tab welded to the foil to provide electrical connections to the battery. Copper foils are often used as the current collector because copper is a good conductor of electrical current, and nickel tabs are often connected to these because they can be easily welded to copper. As demands for lower weight batteries become ever more urgent, the current collector needs to be thinner to reduce the size and weight of lithium-ion secondary battery. Additionally, to increase the capacity of the lithium-ion secondary battery, materials such as silicon (Si), germanium (Ge), and tin (Sn) are mixed with or fill the higher capacity active material in a battery. These demands provide challenges to the manufacturing steps. For example, the process steps for producing the batteries can include exposing the copper foil to high temperatures. In one of the process steps, the active material is deposited on the copper foil as a slurry and then subjected to drying in an oven at a temperature of about 200° C. In another step, the nickel tab is attached using ultrasonic welding which includes stacking the copper and tab on an anvil and pressing these together using a sonotrode at a frequency between 1 and 15 kHz. The friction raises the temperature locally between the two workpieces close to the melting temperature, which when cooled to ambient temperature provides a weld. Since these steps occur in an ambient environment, the copper foil is exposed to oxygen and can become oxidized. Although the copper foil typically includes an anti-tarnish coting such as a chromium coating, in some instances this does not provide enough protection to the copper foil. Oxidation of the copper is a defect that can cause mechanical and electrical failures, for example detachment of the tab and higher current resistance.

There therefore remains a need for improved copper foils for use in lithium-ion secondary batteries. Copper foils having high heat resistance that can withstand ultrasonic welding without oxidation are an unmet need which are addressed herein.

SUMMARY

In general, the disclosure described herein relate to a copper foil such as electrodeposited copper foils that can be used as a current collector in lithium-ion secondary batteries. Copper foils have been prepared having excellent heat resistance suitable for ultrasonic welding during processing and use in general.

In a first aspect, this disclosure provides an electrodeposited copper foil comprising a drum side and a deposited side, wherein both the drum side and the deposited side have a ten-point average roughness Rz lower than or equal to 2 µm, and wherein when the electrodeposited copper foil is subjected to a thermal gravimetric analysis (TGA), the electrodeposited copper foil exhibits a primary weight increase of 105 wt. % when a primary temperature ($T_{105\ wt\ \%}$) is reached during the TGA. The $T_{105\ wt\ \%}$ is in a range of 350° C. to 501° C. and the TGA comprises heating at a rate of 5° C./min and an air flow at a rate of 95 mL/min.

Optionally, the electrodeposited copper foil exhibits a secondary weight increase of 100.1 wt. % when a secondary temperature ($T_{100.1\ wt\ \%}$) is reached during the TGA, wherein the $T_{100.1\ wt\ \%}$ is in a range of 130° C. to 230° C. For example, and optionally, wherein the $T_{100.1\ wt\ \%}$ is in a range of 130° C. to 200° C. Optionally the copper foil further comprising a chromium coating on the drum side and the deposited side.

In some options, the electrodeposited copper foil exhibits an onset temperature ($T_{onset}$) during the TGA, wherein the $T_{onset}$ is in a range of 300° C. to 430° C. Optionally, the $T_{onset}$ is in a range of 320° C. to 430° C. Optionally, the electrodeposited copper foil exhibits a Weight Increase Rate (WIR) in a range of 0.068 to 0.313 wt %/° C., wherein the WIR is defined by Formula I:

$$WIR = \frac{5\ (\text{wt}\ \%)}{T_{105\ wt\ \%}(°\ C.) - T_{onset}(°\ C.)}.$$

Optionally, the WIR is in a range of 0.068 to 0.25 wt %/° C., such as in a range of 0.068 to 0.20 wt %/° C.

In a second aspect, this disclosure provides a secondary lithium-ion battery comprising the electrodeposited copper foil according to the first aspect and an active material coated on the electrodeposited copper foil, wherein the electrodeposited copper foil is welded to a nickel connecting tab.

The electrodeposited copper foil as described herein shows excellent heat resistance properties. These properties provide a copper foil that can be processed with ultrasonic welding in ambient conditions.

The above summary is not intended to represent every embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings.

Figure 1:
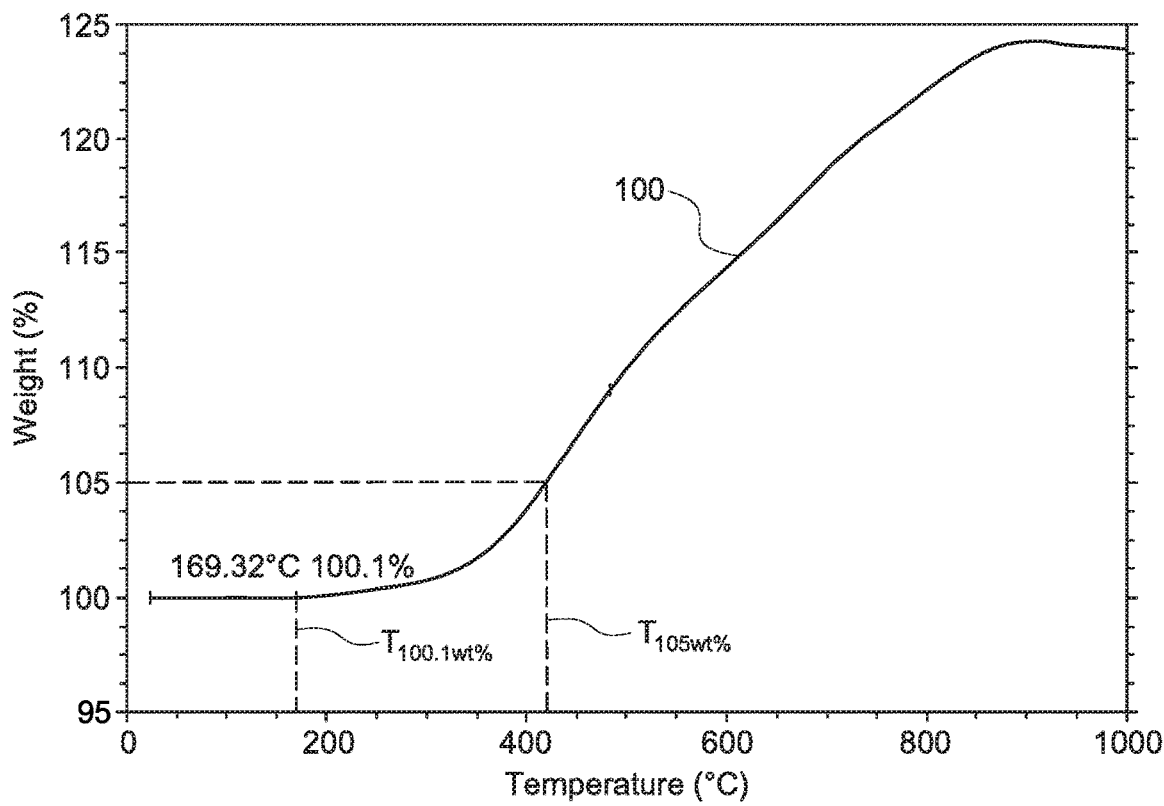
FIG. 1 shows a TGA curve illustrating some features of an electrodeposited copper foil.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

It should be expressly understood that all the graphics and other representations of the drawings are schematic only. The same numbers are used to represent similar elements in various figures of the drawings to facilitate understanding of the disclosed embodiments.

DETAILED DESCRIPTION

Electrodeposited copper foils made using a drum deposition and having a drum side and a deposition side are described herein. These copper foils have excellent heat resistance and can be used as current collectors for lithium-ion secondary batteries. The copper foils have a roughness, Rz, that is controlled below 2 µm and characteristic thermal properties as determined by TGA such as a primary weight increase of 105 wt. % that is in a range of 350° C. to 501° C. Ultrasonic welding of the copper foils to nickel foil tabs provides an excellent weld with low detachment providing a good mechanical and electrical contact.

As used herein the "drum side" of the copper foil is the surface of the copper foil that is in contact with a drum used during the electrodeposition, while the "deposited side" is the opposite side, or the surface of the electrodeposited copper foil that is in contact with an electrolyte solution during the electrodeposition forming the copper foil. These terms relate to a manufacturing process for producing electrodeposited copper foils which include partially immersing a rotating drum assembly into an electrolyte solution containing copper ions. Therefore, under operation of an electric current, copper ions are drawn to the drum and reduced, resulting in copper metal plating onto the surface of the drum forming an electrodeposited copper foil on the surface of the drum. This copper foil so formed is removed from the drum in a continuous process by rotating the drum and removing the copper foil as the formed copper foil rotates with the drum out of the electrolyte solution. For example, the copper foil can be pulled off the drum as it is formed by, and passed over or through rollers in a continuous process.

In some embodiments, the electrodeposited copper foil includes an anti-tarnish coating formed on its surfaces which can protect the electrodeposited copper foil from degradation such as due to corrosion. This can be made by any known method and includes dipping or passing the formed electrodeposited copper foil through a solution containing anti-tarnish forming additives, or plating (e.g., electroplating) a metal or alloy film on the formed electrodeposited sheet. For example, a bath including any one or more of zinc, chromium, nickel, cobalt, molybdenum, vanadium and combinations thereof; or an organic compound that forms an anti-tarnish resistant layer. The processing can be continuous and part of the overall process in preparing the electrodeposited copper foil. In some embodiments, the coating is about one nanometer in thickness, such as between about 0.1 and 10.0 nm, or between about 0.5 and about 2 nm.

One characteristic feature of the electrodeposited copper foil according to some embodiments is the surface roughness. "Roughness" as used herein refers to the deviations in a surface in a direction normal to the real surface from an ideal, perfectly smooth, surface. Various methods of quantifying roughness are known in the art. For example, ten-point average roughness Rz is a surface roughness based on profiling a surface over a sampling length (L). The sum of the highest five peaks and lowest five peaks are calculated as an average. This is represented by Formula II:

$$Rz = \frac{|Rp1 + Rp2 + Rp3 + Rp4 + Rp5| + |Rv1 + Rv2 + Rv3 + Rv4 + Rv5|}{5}.$$

In Formula II: $Rp1$, $Rp2$, $Rp3$, $Rp4$ and $Rp5$ are the levels of the highest peak to the fifth highest peak in L; and $Rv1$, $Rv2$, $Rv3$, $Rv4$ and $Rv5$ are the levels of the lowest trough to the fifth lowest trough in L.

In some embodiments the Rz has been found to modulate the adhesion of the copper foil to an active material. Without being bound by any specific theory it is proposed that having a very low Rz does not provide enough anchorage for the active material to the copper foil, while having to high Rz does not allow for a uniform coating. The adhesion can be tested by a yield adhesion test, for example as described below. In some embodiments, the Rz on both the drum side and deposition side of the electrodeposited copper foil is less than or equal to 2.0 µm, such as between about 2.0 and about 1.0; or 2.0, 1.9, 1.8, 1.6, 1.7, 1.6, 1.5, 1.4, 1.3, 1.2, 1.1 or 1.0 µm.

Another characteristic of the electrodeposited copper foil according to some embodiments is the heat resistance properties. These properties can be determined by "Thermogravimetic Analysis," "Thermal Gravimetric Analysis" or "TGA," which refer to a method for characterizing a material by subjecting it to a temperature change over time and observing changes in mass. Both positive change in mass (weight increase) and negative changes in mass (weight decrease) can occur. For example, in some instances a material loses a small molecule such as water or $CO_2$ due to desorption or decomposition leading to a weight decrease. In other instances, a material can increase in weight, for example through chemical reaction with the environment, such as by oxidation. By carefully controlling the rate of heating and the environment a mass vs time plot, known as a TGA curve, for a material can be made. The curve is characteristic of the material and can define the material due to unique processes or changes in mass upon controlled heating that are indicative or responsive to the composition of the material. In addition, the TGA curve can be further analyzed to tease out specific characteristics such as different slopes, inflection points, and regions that are related to the material composition and structure. Therefore, a material can have several increases and decreases in mass when subjected to a controlled heating program and environment which can be further analyzed to reveal and define the unique characteristics of the material.

An electrodeposited copper foil according to some embodiments was subjected to a TGA analysis which was recorded as the TGA curve 100 shown by FIG. 1. The analysis was done using a ramp of 5° C./min and an air flow (e.g., ambient air near sea level) at a rate of 95 mL/min. The analysis shows some characteristic features which are annotated in the figure.

One feature indicated in FIG. 1 is a primary weight increase temperature which is defined as the temperature at which the material has increased to 105% of the original weight, indicated as $T_{105\ wt\ \%}$. Without being bound to any specific theory it is believed that at about a weight increase of 105 wt %, most of the weight increase in the copper foil is due to bulk oxidation of the copper foil. Therefore, the $T_{105\ wt\ \%}$ can be used as an indicator of the resistance to bulk oxidation of the copper foil. For example, a first copper foil that exhibits a $T_{105\ wt\ \%}$ that is higher than a $T_{105\ wt\ \%}$ of a second copper foil indicates that the first copper foil has a higher resistance to bulk copper foil oxidation than the second copper foil. In addition, since the TGA provides a heating at a fixed rate, a higher $T_{105\ wt\ \%}$ can indicate a slower oxidation rate of the bulk copper foil.

In some embodiments the $T_{105\ wt\ \%}$ value is in a range of 350 and 501° C. It is to be expressly understood that these ranges are continuous and could be represented as any value between and including 350 and 501° C. For example, and without limitation: any value in this range and optionally above 375, 400, 425, 450 or 475° C.; and any value in this range and optionally below 475, 450, 425, 400 or 375° C.

Another feature illustrated in FIG. 1 is a secondary weight increase where the weight increases to 100.1% of the initial weight. This is indicated by $T_{100.1\ wt\ \%}$ in the figure. The $T_{100.1\ wt\ \%}$ can be viewed as the temperature where the copper foil first starts to experience a weight increase. Without being bound by any specific theory it is suggested that this secondary weight increase is due to oxidation events at the surface of the copper film, such as an anti-tarnish coating on the copper foil. A higher $T_{100.1\ wt\ \%}$ can also indicate a delay in oxidation of the surface of the copper foil, or slower kinetics of oxidation of an anti-tarnish coating.

In some embodiments the $T_{100.1\ wt\ \%}$ is in a range of 130° C. to 230° C. In some other embodiments the $T_{100.1\ wt\ \%}$ is in a range of 130° C. to 200° C. It is understood that this includes any value between and including the bounding values. For example: any value in these ranges and optionally above 140, 150, 160, 170, 180, 190, 200, 210 or 220° C.; and any value in these ranges and optionally below 220, 210, 200, 180, 170, 160, 150 or 140° C.

Figure 2:
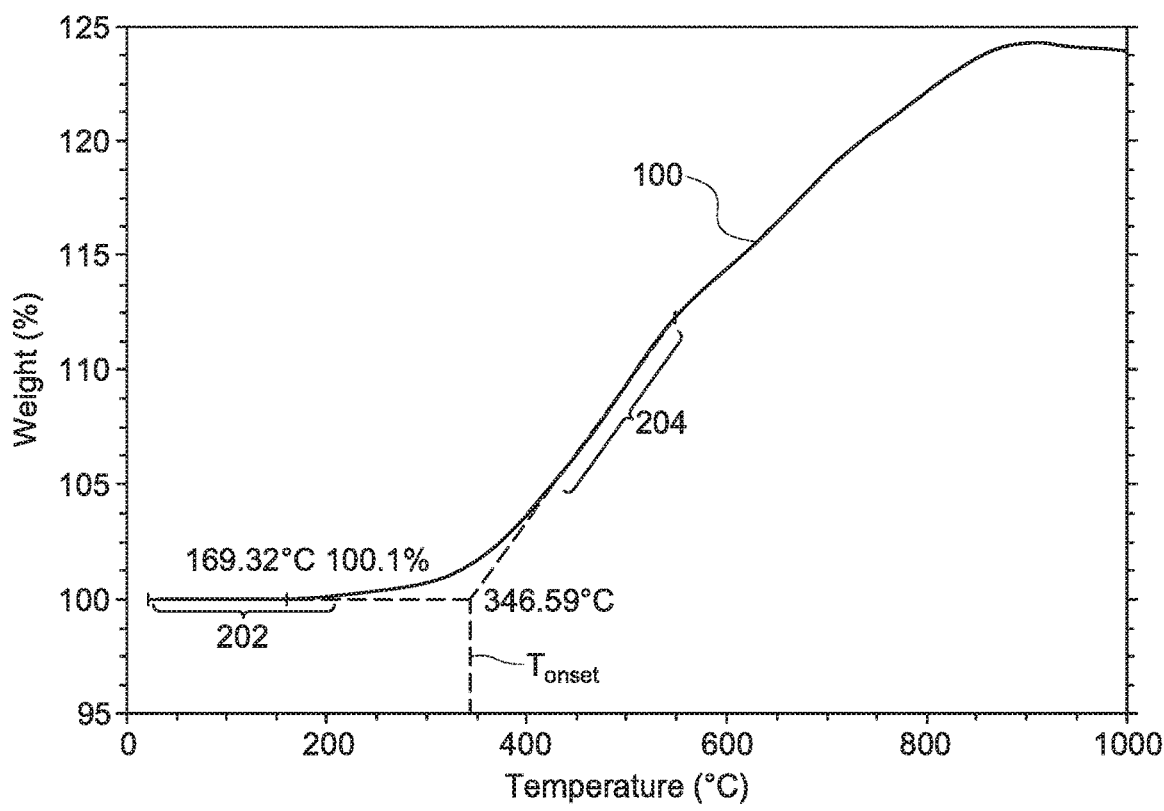
FIG. 2 shows the TGA curve illustrating some other features of the electrodeposited copper foil.

FIG. 2 illustrates another feature of an electrodeposited copper foil that can be derived from TGA curve 100. The feature is an onset temperature, which is indicated are $T_{onset}$ in the figure. This is a temperature where the copper foil weight starts to increase at a high rate. The onset temperature is determined by extrapolating a linear initial portion 202 of curve 100 and a subsequent linear portion 204 of the curve 100. The intersection occurs at the $T_{onset}$. The $T_{onset}$ is automatically calculated by using software "TA Universal Analysis." Without being bound to a specific theory it is proposed that a first copper foil having a $T_{onset}$ higher than a second copper foil's $T_{onset}$, indicates that the first copper foil has a higher resistance to the onset of bulk copper foil oxidation.

In some embodiments the $T_{onset}$ is in a range of 300° C. to 430° C. It is understood that this includes any value between and including the bounding values. For example: any value in these ranges and optionally above 300, 310, 320, 330, 340, 350, 360, 370, 380, 390, 400, 410 or 420° C.; and any value in these ranges and optionally below 430, 420, 410, 400, 390, 380, 370, 360, 350, 340, 330, 320 or 310° C.

The slope of the linear portion 204 is also a characteristic of the copper foil. For example, some copper foils can have a higher slope, while others can have a lower slope. An approximation of this slope is the Weight Increase Rate or WIR as represented in Formula I:

$$WIR = \frac{5\ (\text{wt}\ \%)}{T_{105wt\%}(°\ C.) - T_{onset}(°\ C.)}.$$

The reason this is an approximation is that the $T_{onset}$ does not occur at 100 wt % but rather at a slightly higher value (>100.1 wt %) that is determined by the slope of linear portion 202. Since the slope of 202 is typically shallow, e.g., between about 0 and 0.0004 wt %/° C., WIR is a useful approximation for the slope of 204. Without being bound to a specific theory it is proposed that, a first copper foil having a WIR or slope of the linear portion 204 that is higher that a second copper foil indicates a higher sensitivity to degradation of the bulk copper foil by oxidation than in the second copper foil where the WIR or slope of the linear portion of 204 is lower.

In some embodiments WIR is in a range of 0.068 to 0.313 wt %/° C. In some embodiments WIR in a range of 0.068 to 0.25 wt %/° C. In some embodiment WIR is in a range of 0.07 to 0.15 wt %/° C. For example: any value in these ranges and above 0.075, 0.1, 0.125, 0.15, 0.175, 0.20, 0.225, 0.25, 0.275 or 0.30; and any valued in these ranges and below 0.30, 0.275, 0.25, 0.225, 0.20, 0.175, 0.15, 0.125, 0.10 or 0.075, such as 0.068 to 0.25 wt %/° C.

In some embodiments, the thermal characteristics and Rz of the electrodeposited copper foil can be controlled by the trace impurities or additive in the various electrolytes used during electrodeposition and anti-tarnish coating. For example, in some embodiments any one or more of trace metals, such as zirconium and titanium, and trace impurities such particles (e.g., dust or anode sludge) added or present in the electrodeposition electrolyte modulates the Rz and thermal properties. In some embodiments, the concentration of anti-tarnish metal such as $CrO_3$, the pH, and the Total Carbon Content (TOC) used for applying the anti-tarnish coating as well as the current applied during the anti-tarnish coating application, can impact the Rz and thermal properties of the copper foil. Without being bound to a specific theory it is suggested that these trace impurities can change the structure of the foil either by incorporation of the impurities or by modulation of the structure of the copper foil (e.g., the bulk and surface of the copper foil-including the anti-tarnish coating) in ways that are manifested by the Rz and thermal properties.

In some embodiments, the electrodeposited copper foils can be used as current collectors for batteries (e.g., lithium-ion secondary batteries). The battery can include a welded nickel connecting tab, such as welded by ultrasonic welding. These electrodeposited copper foils can be used in a device such as any item or component requiring electric power for its operation. For example, self-contained, isolated and mobile components and devices requiring small and light batteries. Without limitation, these can include vehicles (automobiles, street cars, buses, trucks, boats, submarines, airplanes), computers (e.g., for microcontrollers, laptops, tablets), phones (e.g., smart phones, wireless landlines), personal health monitoring and sustaining equipment (e.g., glucose monitors, pacemakers), tools (e.g., electric drills, electric saws), illuminators (e.g., flashlights, emergency lighting, signs), hand held measuring devices (e.g., pH meters, air monitoring devices) and habitation units (e.g., in a spaceship, in a trailer, in a house, in a plane, in a submarine).

It should be understood within the scope of the present disclosure, the above-mentioned technical features and technical features mentioned below (such as examples) can be combined freely and mutually to form new or preferred technical solutions, which are omitted for brevity.

EXAMPLES

I. Electrodeposited Copper Foil Preparation

An electrolyte was made by dissolving copper wire in an aqueous solution of sulfuric acid (50 wt %) affording a copper sulfate electrolyte solution which contained 80 g/L of copper sulfate ($CuSO_4 \cdot 5H_2O$) and 110 g/L of sulfuric acid. To every liter of the copper sulfate electrolyte, 3 mg of sodium 3-mercaptopropane sulphonate (MPS, manufactured by Hopax Chemicals Manufacturing Company Ltd.), 25 mg of hydrochloric acid (manufactured by RCI Labscan Ltd.), 5.5 mg of a low-molecular-weight gel (SV, manufactured by Nippi, Inc.), 6.25 mg of Zirconium sulphate (manufactured by Sigma Aldrich) and 0.39 mg N,N'-Diethylthiourea (manufactured by Alfa Aesar®) were added. Additional trace components that are controlled in the electrolyte include at least one of zirconium ions (in a range of 0 to 10 ppm) and titanium ions (in a range of 0 to 15 ppm). Also included in the electrolyte are particle impurities, which are controlled in a range between 200 and 500 particles/mL (no./mL). Suspended impurities can include but are not limited to dust, anode sludge and hydrolyzed product of metal impurities.

Bulk copper foils were prepared by electrodeposition on a rotating drum, where the drum is partially immersed in the electrolyte solution described above. The drum acts as a cathode to a counter anode electrode which causes copper ions in the electrolyte to deposit on the drum in a continuous fashion. Copper foils having a thickness of about 8 µm were prepared using a current density of 50 A/$dm^2$ and controlling the electrolyte solution temperature at about 50° C.

After the bulk copper foil was produced, both sides of the bulk copper foil were treated with chromium plating. The chromium plating bath contained $CrO_3$ as the main component, where the concentration is varied in the range between 2 and 100 g/L. Additionally, the pH of the chromium plating bath is varied in the range between pH 1 and 6. The Total Organic Carbon (TOC) is controlled in a range of 50 to 100 ppm. The specific concentrations of $CrO_3$, pH and TOC are indicated in Tables 1 and 2. The bulk copper foil was electroplated at 2 ASD (A/$dm^2$) for 1 second while the chromium plating bath was maintained at 25° C.

Table 1 and 2 list several electrodeposited copper foils made as described above. These were analyzed by TGA and for surface roughness, and the characteristic $T_{105\ wt\ \%}$, $T_{100.1\ wt\ \%}$, $T_{onset}$, WIR and Rz values are listed. The copper foils were coated with an active material and the adhesion of the active material was measured which is also listed in the tables. A nickel tab was attached by ultrasonic welding and its attachment to the copper foil was also evaluated and listed.

TABLE 1

Examples of Copper Foils

| | Electrolyte | | | Anti-tarnish coating | | | | TGA analysis | | | | | Yield of | |
|---|---|---|---|---|---|---|---|---|---|---|---|---|---|---|
| | Zr ion (ppm) | Ti ion (ppm) | particle (no./ml) | $CrO_3$ Conc. (g/l) | Current (ASD) | pH | TOC (ppm) | $T_{100.1\ wt\ \%}$ (° C.) | $T_{onset}$ (° C.) | $T_{105\ wt\ \%}$ (° C.) | WIR[1] (wt %/° C.) | Rz (µm) | adhesion of active material[2] | Ultrasonic weld[3] |
| E1 | 2 | 0 | 200 | 2 | 2 | 1 | 100 | 131 | 354 | 401 | 0.106 | 1.5 | ○ | ○ |
| E2 | 2 | 0 | 500 | 2 | 2 | 6 | 100 | 139 | 334 | 350 | 0.313 | 1.4 | ○ | ○ |
| E3 | 2 | 0 | 200 | 2 | 5 | 1 | 100 | 151 | 351 | 402 | 0.098 | 1.6 | ○ | ○ |
| E4 | 0 | 5 | 200 | 2 | 5 | 1 | 100 | 153 | 352 | 404 | 0.096 | 1.6 | ○ | ○ |
| E5 | 2 | 0 | 500 | 2 | 5 | 6 | 100 | 158 | 331 | 351 | 0.250 | 1.5 | ○ | ○ |
| E6 | 2 | 0 | 200 | 10 | 2 | 1 | 100 | 142 | 350 | 400 | 0.100 | 1.5 | ○ | ○ |
| E7 | 2 | 0 | 500 | 10 | 2 | 6 | 100 | 150 | 330 | 352 | 0.227 | 1.4 | ○ | ○ |
| E8 | 2 | 0 | 200 | 10 | 5 | 1 | 100 | 163 | 352 | 403 | 0.098 | 1.6 | ○ | ○ |
| E9 | 2 | 0 | 500 | 10 | 5 | 6 | 100 | 174 | 333 | 351 | 0.278 | 1.5 | ○ | ○ |
| E10 | 6 | 10 | 200 | 2 | 2 | 1 | 50 | 145 | 428 | 501 | 0.068 | 1.6 | ○ | ○ |
| E11 | 10 | 0 | 200 | 2 | 2 | 1 | 50 | 145 | 425 | 496 | 0.070 | 1.6 | ○ | ○ |
| E12 | 10 | 0 | 500 | 2 | 2 | 6 | 50 | 155 | 385 | 453 | 0.074 | 1.4 | ○ | ○ |
| E13 | 10 | 0 | 200 | 2 | 5 | 1 | 50 | 167 | 424 | 497 | 0.068 | 1.4 | ○ | ○ |
| E14 | 10 | 0 | 500 | 2 | 5 | 6 | 50 | 173 | 381 | 454 | 0.068 | 1.5 | ○ | ○ |
| E15 | 10 | 0 | 200 | 10 | 2 | 1 | 50 | 158 | 423 | 495 | 0.069 | 1.6 | ○ | ○ |
| E16 | 10 | 0 | 500 | 10 | 2 | 6 | 50 | 166 | 380 | 452 | 0.069 | 1.6 | ○ | ○ |
| E17 | 10 | 0 | 200 | 10 | 5 | 1 | 50 | 178 | 424 | 494 | 0.071 | 1.5 | ○ | ○ |
| E18 | 0 | 15 | 500 | 10 | 5 | 6 | 50 | 184 | 386 | 455 | 0.072 | 1.4 | ○ | ○ |
| E19 | 10 | 0 | 500 | 10 | 5 | 6 | 50 | 185 | 382 | 453 | 0.070 | 1.4 | ○ | ○ |
| E20 | 10 | 0 | 500 | 11 | 6 | 6 | 100 | 206 | 381 | 449 | 0.074 | 1.6 | Δ | ○ |
| E21 | 10 | 0 | 500 | 13 | 7 | 6 | 50 | 230 | 382 | 451 | 0.072 | 1.5 | Δ | ○ |

[1]The values are provided by the TGA analysis software and approximate the values of WIR.
[2]"○" indicates yield is 100%, "Δ" indicates yield is equal to or higher than 80% and lower than 100%, "X" indicates yield is lower than 80%.
[3]"○" indicates copper and nickel foil remain attached, "X" copper foil detached from nickel foil, "—" indicates no test done because adhesion of active material was too poor.

TABLE 2

Comparative Examples of Copper foils

| | Electrolyte | | | Anti-tarnish coating | | | | TGA analysis | | | | Yield of | | |
|---|---|---|---|---|---|---|---|---|---|---|---|---|---|---|
| | Zr ion (ppm) | Ti ion (ppm) | particle (no./ml) | $CrO_3$ Conc. (g/l) | Current (ASD) | pH | TOC (ppm) | $T_{100.1\ wt\%}$ (° C.) | $T_{onset}$ (° C.) | $T_{105\ wt\%}$ (° C.) | $WIR^1$ (wt %/° C.) | Rz (μm) | adhesion of active material[2] | Ultrasonic weld[3] |
| C1 | 0 | 0 | 200 | 2 | 2 | 1 | 100 | 132 | 311 | 331 | 0.25 | 1.5 | ◯ | X |
| C2 | 0 | 0 | 500 | 10 | 5 | 6 | 100 | 184 | 287 | 315 | 0.179 | 1.6 | ◯ | X |
| C3 | 12 | 0 | 500 | 2 | 2 | 6 | 100 | 150 | 430 | 504 | 0.068 | 2.2 | X | — |
| C4 | 0 | 20 | 500 | 2 | 2 | 6 | 100 | 150 | 433 | 506 | 0.068 | 2.2 | X | — |
| C5 | 2 | 0 | 800 | 2 | 5 | 1 | 100 | 153 | 275 | 301 | 0.192 | 1.4 | ◯ | X |
| C6 | 2 | 0 | 100 | 2 | 5 | 1 | 100 | 152 | 277 | 304 | 0.185 | 1.4 | ◯ | X |
| C7 | 0 | 15 | 100 | 10 | 5 | 6 | 50 | 182 | 281 | 311 | 0.167 | 1.4 | ◯ | X |
| C8 | 0 | 2 | 100 | 2 | 5 | 1 | 100 | 151 | 251 | 272 | 0.238 | 1.5 | ◯ | X |
| C9 | 0 | 2 | 800 | 2 | 5 | 1 | 100 | 150 | 250 | 274 | 0.208 | 1.5 | ◯ | X |
| C10 | 0 | 0 | 200 | 15 | 10 | 6 | 50 | 245 | 310 | 333 | 0.217 | 1.6 | X | — |

[1]The values are provided by the TGA analysis software and approximate the values of WIR.
[2]"◯" indicates yield is 100%, "Δ" indicates yield is equal to or higher than 80% and lower than 100%, "X" indicates yield is lower than 80%.
[3]"◯" indicates copper and nickel foil remain attached, "X" copper foil detached from nickel foil, "—" indicates no test done because adhesion of active material was too poor.

These results show how the thermal and Rz characteristics of the copper foils impact important properties such as the adhesion of the active material and the Ultrasonic weld. For example, where $T_{onset}$ is 330° C. or higher and $T_{105\ wt\%}$ is 350 and higher, indicative of a delayed onset of bulk copper oxidation and high resistance to bulk copper foil oxidation, the ultrasonic weld is always good. In the two experiments C3 and C4 where the $T_{onset}$ and $T_{105\ wt\%}$ is 350 are also high, no ultrasonic weld data was collected because the adhesion yield test results were poor, rendering these copper foils unsuitable for their intended purpose. It is also noted that in the C3 and C4 experiments the $T_{105\ wt\%}$ is very high, above 501° C., and may be indicative of some structural or compositional changes in the copper foil that detrimentally effects the adhesion, such as, incorporation of an undetected or undetectable impurity. It is also noted that in C3 and C4, the Rz is higher than in all the other experiment (above 2 μm) and may be a manifestation of said suggested structural or compositional changes. Regarding WIR data, it is generally found that where the WIR is low, indicative of a less sensitivity to oxidation or slower oxidation kinetics, the ultrasonic weld results are good. For example, in E1, E3-4, E6, E8 and E10-E21 the WIR values are all 0.10 or lower, while in all of the comparative examples (except for C3 and C4 where no ultrasonic testing was done), the WIR values are above 0.15.

II. Test Methods

Thermogravimetric Analysis (TGA)

Thermogravimetic Analysis of the Cooper Foils listed in Table 1 and 2 was done using a TA Instruments Model SDT 2960 Analyzer. Samples of approximately 15~30 mg of the copper foil were loaded into the sample holder and the analysis was conducted under an air flow (21 vol % oxygen, 79 vol % nitrogen) of 95 mL/min while heating from room temperature to 1000° C. at a rate of 5° C./min. Raw data was plotted Weight (%) vs the Temperature (° C.) and also analyzed using TA proprietary Universal Analysis software. This commercial software provided corresponding temperature (e.g., $T_{105\ wt\%}$ and $T_{100.1\ wt\%}$) on the curve when users choose "Curve value at Y" feature and then input a specific weight (e.g., 105 wt % and 100.1 wt %). After getting the actual value of $T_{105\ wt\%}$ and $T_{100.1\ wt\%}$, $T_{onset}$ is calculated by first selecting the "on set point" feature, then defining the manual limit by inputting the lower weight of 100.1 and $T_{100.1\ wt\%}$ and upper limit weight of 105 and $T_{105\ wt\%}$. The slopes 202 and 204 (FIG. 2) can also be calculated and provided by software. It is noted that the slope 204 is approximately the same as WIR as described herein.

Particle Analysis

Particle analysis in solutions was performed using a Rion Model: KE-40B1 particle analyzer having a KS42AF detector. A 10 ml sample of the electrolyte solution was analyzed under a volume speed of 10 ml/mim. After each analysis, the analyzing column was washed. The particles average number of particles within 0.3~0.5 μm size is recorded.

Total Organic Carbon (TOC)

The TOC was measured using an ANALYTIK JENA MULTI_N/C model analyzer. A 5 ml sample of the electrolyte solution was analyzed under a volume speed of 0.5 ml/min.

Ultrasonic Welding

The copper foils were welded to nickel foils using a Texsonic UWM-M1000 model ultrasonic welder. The welding was conducted at 800 W power, 35 khz frequency. The work pieces are rinsed with water and visually inspected to determine if any separation between the work pieces occurred.

Ten Point Average Roughness (Rz)

A surface roughness measuring instrument (Kosaka Laboratory Ltd; SE 600 Series) was used to detect the profile of the copper foils. The diameter of the tip of stylus was 2 μm, and the cone angle of the tip was 90°. The evaluation length (L) was 4.0 mm, and the contour curve was filtered off fh(λc)=0.8 mm. Rz was obtained using standard test method JIS B 0601-1994.

Yield of Adhesion Test

An Si alloy-based active material (average particle size of from 0.1 to 10 um) was used in powder form. An electrode powder mixture was prepared at a ratio of 90 wt. % Si alloy-based active material and 10 wt. % polyimide-based binder as a binding material. A slurry was formed by dispersing the electrode powder in N-methylpyrrolidone (NMP). The slurry was coated on the surface of copper foil at a speed of 5 meters per minute to a thickness of 200 μm and then dried through a 140° C. oven for 10 mins.

The electrode (copper foil+active material) was then pressed. The dimension of the rollers of the pressing machine were φ250 mm×250 mm, hardness of the rollers was 62~65° HRC, and the roller material was high-carbon chrome bearing steel (SUJ2). 1 m/min pressing (calendering) speed and 2000 psi pressure were used. The electrode (after pressing) was cut to obtain 10 test sample pieces in the size of 200 mm×20 mm (length×width). 3M Scotch® Magic™ tape was attached to the surface of each of the test samples, and then the tape was peeled off of each of the test samples using Model DS2-20N force measurement machine made by IMADA corporation under 50 mm/min speed. By observing the tape, if no active material is taken away, the sample piece is considered "pass". If there is any active material detached from the copper foil, the sample piece is considered "fail". After measuring all 10 sample pieces, the yield is calculated and further ranked as follows:
- "O" indicates all ten of the test pieces, or 100% passed;
- "Δ" indicates 8 or 9 of the test pieces, or equal to 80% and lower than 100% passed; and
- "X" indicates less than 8, or less than 80% of the test pieces passed.

Weather Resistance

Samples were prepared by cutting the copper foil into 15 cm×15 cm size squares, which were then placed into a constant temperature and humidity test chamber. The test chamber was set at a temperature of 80° C. and relative humidity (RH) of 80% RH. The samples were left in the chamber for 24 hours. Visual inspection was then used to determine if the samples were discolored. It was found that none of the Examples listed in Table 1 or 2 exhibited any discoloration.

Heat Resistance

Samples were prepared by cutting the copper foil into 15 cm×15 cm size squares. The sample were placed into an oven at 200° C. for 10 min. Visual inspection was then used to determine if the samples were discolored. It was found that none of the Examples listed in Table 1 or 2 exhibited any discoloration.

As used herein the term "comprising" or "comprises" is used in reference to compositions, methods, and respective component(s) thereof, that are essential to the claimed invention, yet open to the inclusion of unspecified elements, whether essential or not.

As used herein the term "consisting essentially of" refers to those elements required for a given embodiment. The term permits the presence of elements that do not materially affect the basic and novel or functional characteristic(s) of that embodiment of the claimed invention.

The term "consisting of" refers to compositions, methods, and respective components thereof as described herein, which are exclusive of any element not recited in that description of the embodiment.

As used in this specification and the appended claims, the singular forms "a," "an," and "the" include plural references unless the context clearly dictates otherwise. Thus for example, references to "the method" includes one or more methods, and/or steps of the type described herein and/or which will become apparent to those persons skilled in the art upon reading this disclosure and so forth. Similarly, the word "or" is intended to include "and" unless the context clearly indicates otherwise.

Other than in the operating examples, or where otherwise indicated, all numbers expressing quantities of ingredients or reaction conditions used herein should be understood as modified in all instances by the term "about." The term "about" when may mean±5% (e.g., ±4%, ±3%, ±2%, ±1%) of the value being referred to.

Where a range of values is provided, each numerical value between and including the upper and lower limits of the range is contemplated as disclosed herein. It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

Unless otherwise defined herein, scientific and technical terms used in connection with the present application shall have the meanings that are commonly understood by those of ordinary skill in the art. Further, unless otherwise required by context, singular terms shall include pluralities and plural terms shall include the singular.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

Any patents, patent applications, and publications including ASTM, JIS methods identified that are disclosed herein are expressly incorporated herein by reference for the purpose of describing and disclosing, for example, the methodologies described in such publications that can be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

We claim:

1. An electrodeposited copper foil comprising a drum side and a deposited side;
   wherein each of the drum side and the deposited side of the electrodeposited copper foil have a ten-point average roughness, Rz, in the range of 1.0 μm to less than or equal to 2 μm, and each of the drum side and the deposited side of the electrodeposited copper foil further comprise a chromium coating, wherein the electrodeposited copper foil exhibits a primary weight increase of 105 wt. %, when a primary temperature ($T_{105\ wt\ \%}$) is reached during thermal gravimetric analysis (TGA), wherein the primary temperature ($T_{105\ wt\ \%}$), is in a range of 350° C. to 501° C., and
   wherein the TGA comprises heating the electrodeposited copper foil at a rate of 5° C./min and an air flow at a rate of 95 mL/min.

2. The electrodeposited copper foil according to claim 1, wherein the electrodeposited copper foil exhibits a secondary weight increase of 100.1 wt. % when a secondary temperature ($T_{100.1\ wt\ \%}$) is reached during the TGA, wherein the $T_{100.1 wt\ \%}$ is in a range of 130° C. to 230° C.

3. The electrodeposited copper foil according to claim 2, wherein the $T_{100.1\ wt\ \%}$ is in a range of 130° C. to 200° C.

4. The electrodeposited copper foil according to claim 1, wherein the electrodeposited copper foil exhibits an onset temperature ($T_{onset}$) during the TGA, wherein the $T_{onset}$ is in a range of 300° C. to 430° C.

5. The electrodeposited copper foil according to claim 4, wherein the $T_{onset}$ is in a range of 320° C. to 430° C.

6. The electrodeposited copper foil according to claim 4, wherein the electrodeposited copper foil exhibits a Weight Increase Rate (WIR) in a range of 0.068 to 0.313 wt %/° C., wherein the WIR is defined by Formula I:

$$WIR = \frac{5 \text{ (wt \%)}}{T_{105 wt \%}(°C.) - T_{onset}(°C.)}. \quad (I)$$

7. The electrodeposited copper foil according to claim 6 wherein the WIR is in a range of 0.068 to 0.25 wt. %/° C.

8. The electrodeposited copper foil according to claim 6, wherein the WIR is in a range of 0.068 to 0.20 wt. %/° C.

9. A secondary lithium-ion battery comprising the electrodeposited copper foil of claim 1 and an active material coated on the electrodeposited copper foil, wherein the electrodeposited copper foil is welded to a nickel connecting tab.

\* \* \* \* \*